United States Patent

Radcliffe

[15] 3,698,603
[45] Oct. 17, 1972

[54] WATER-DISTRIBUTING SYSTEM FOR A HOT AND COLD DRINKING WATER DISPENSER
[72] Inventor: Richard J. Radcliffe, Gahanna, Ohio
[73] Assignee: Ebco Manufacturing Company, Columbus, Ohio
[22] Filed: July 9, 1971
[21] Appl. No.: 161,052

[52] U.S. Cl. ............................222/146 R, 222/146 C
[51] Int. Cl. .........................................B67d 5/62
[58] Field of Search......222/146 R, 146 C, 146 H, 146 HE

[56] References Cited

UNITED STATES PATENTS 1,969,960   8/1934   Blum....................222/146 R
3,540,629   11/1970  Ballentine..............222/146 R Primary Examiner—Richard A. Schacher
Attorney—William S. Rambo

[57] ABSTRACT

An inverted bottle-type drinking water dispenser having a pair of vertically spaced, water cooling and heating receptacles joined by a readily demountable water-distributing manifold having passages therein connecting the receptacles with a pair of externally accessible faucet valves. A central conduit interconnects the water-cooling and heating receptacles and is provided with baffle means to minimize water turbulence and thermosyphoning between the heating and cooling receptacles.

6 Claims, 5 Drawing Figures

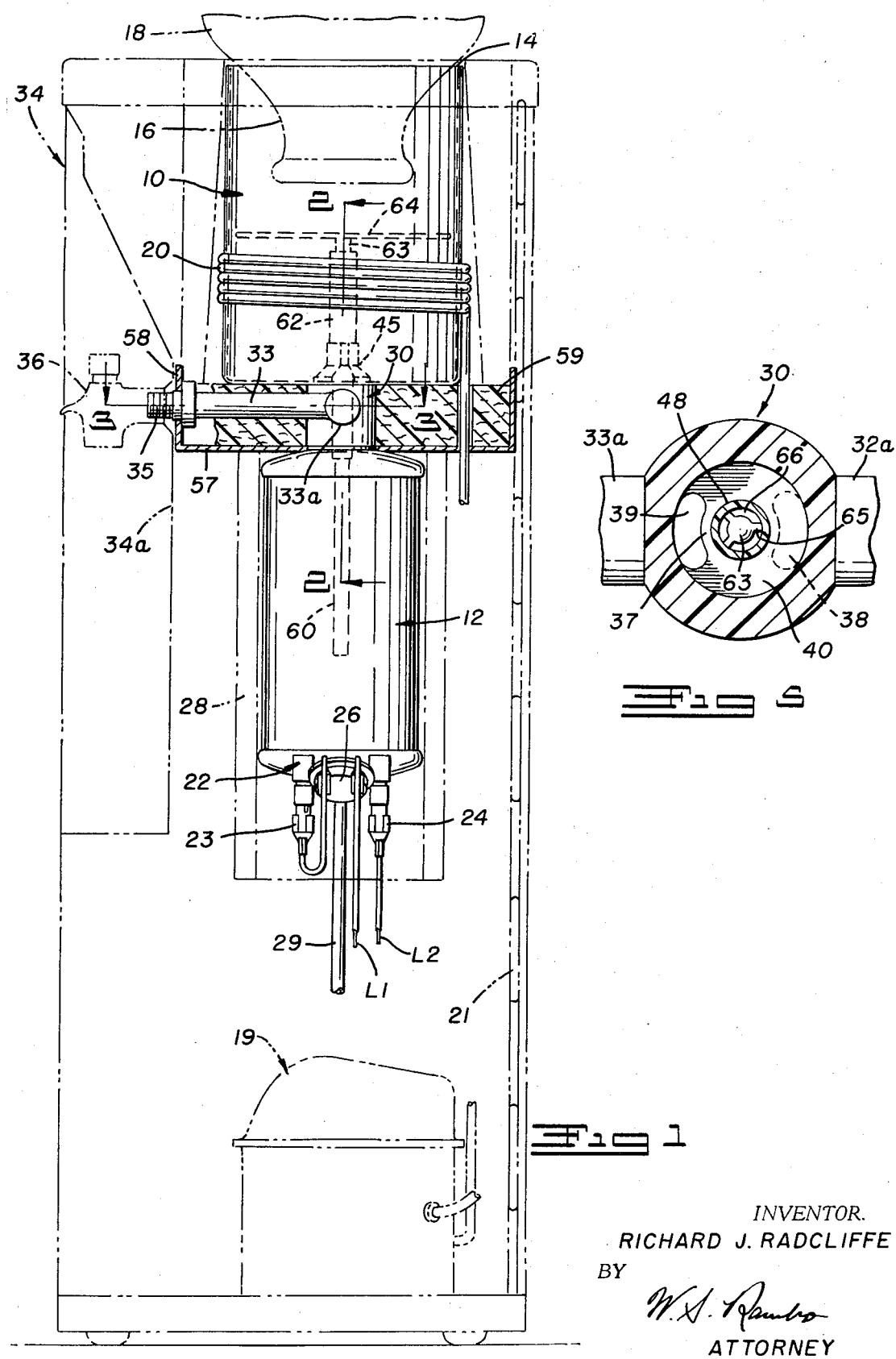

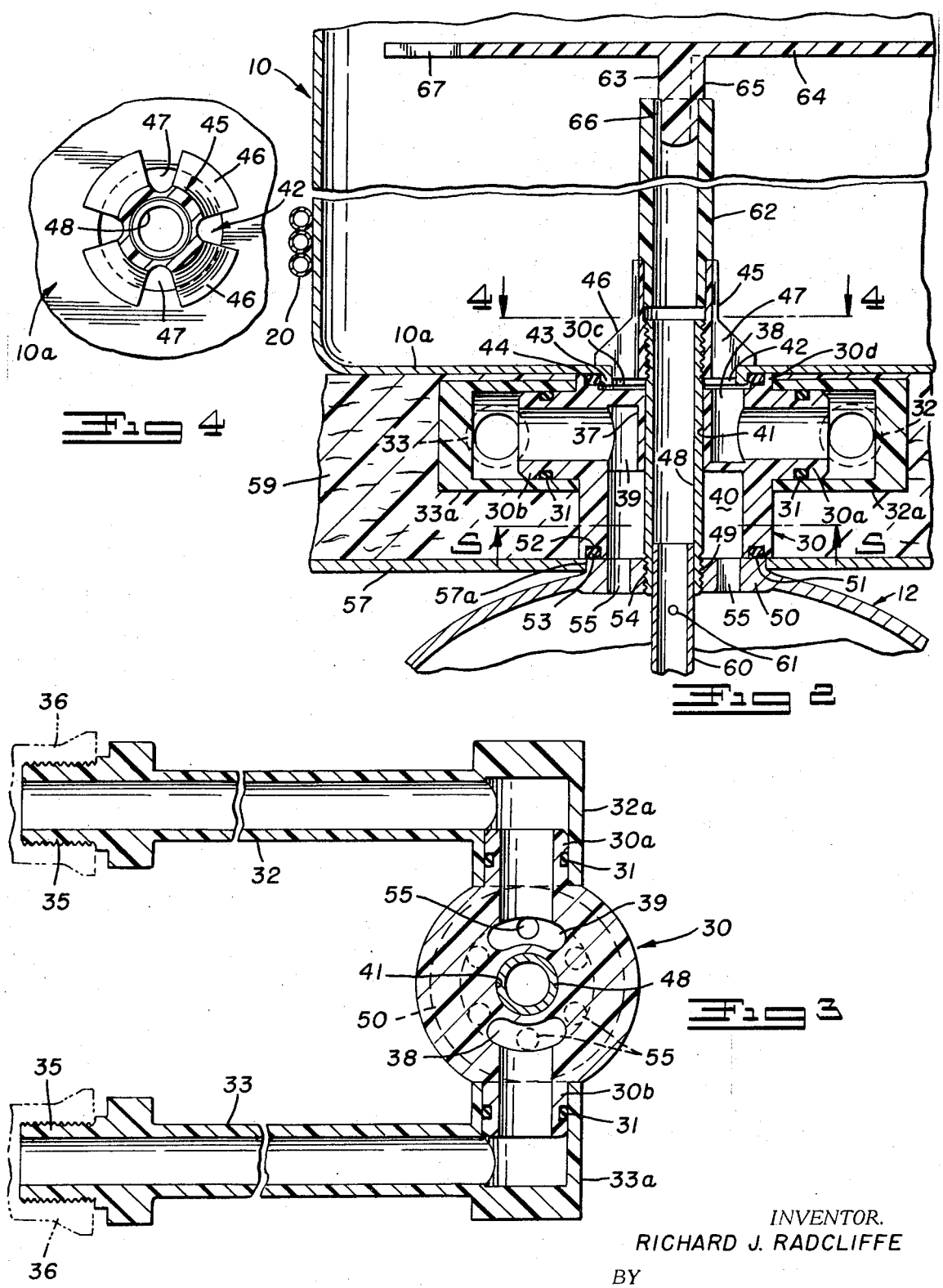

WATER-DISTRIBUTING SYSTEM FOR A HOT AND COLD DRINKING WATER DISPENSER

BACKGROUND OF THE INVENTION

The present invention relates generally to drinking water dispensers, and more particularly to an improved water-distributing system for a hot and cold drinking water dispenser.

Most offices, schools factories and stores provide drinking water dispensers as a readily available source of drinking water dispensers as a readily available source of refreshment for their personnel. While some are plumbed to a municipal water supply, others employ a replaceable water container, such as a top mounted, inverted, water bottle as a source of water supply. Certain types of drinking water dispensers, such as that described in prior U.S. Pat. No. 2,784,879 issued Mar. 12, 1957 to Fischer, incorporate means for heating and supplying hot water in combination with means for refrigerating and supplying chilled water. These so-called hot and cold water dispensers are provided with a refrigeration system for cooling a portion of the water and a heating system for heating another portion of the water supplied from an inverted bottle or similar receptacle.

The primary difficulties encountered with these prior art hot and cold water dispensers arise from a mixing of the heated water with the refrigerated water by thermal convection and the tendency of the hot water passages and conduits to become clogged or obstructed by lime deposits, etc. In order to provide a compact dispenser, the water-cooling and heating receptacles are generally disposed in relatively closely spaced relation to one another and are interconnected by a conduit through which water from the cooling receptacle is supplied to the heating tank or receptacle. Heretofore, it has been difficult to prevent convection flow of hot water from the heating tank to the cooling receptacle, particularly when one of the faucet valves is opened, since this usually creates turbulence in either the heating tank, or the cooling receptacle, or both, thus resulting in an undesirable mixing of heated water with chilled water and a consequent reduction of thermal efficiency in the dispenser.

Also, these hot and cold water dispensers have heretofore been constructed with soldered or brazed conduit joints and connections between the cooling and heating tanks and it has been extremely difficult to service and repair these dispensers in the event the hot water tank and its associated conduits become clogged or obstructed with mineral deposits, or in the event of failure of the heating element associated with the water-heating tank.

SUMMARY AND OBJECTS OF THE INVENTION

Accordingly, this invention provides an improved water-distributing system for a bottle-type hot and cold drinking water dispenser which includes an upper water-cooling receptacle or tank having an opening at its upper end to receive the neck portion of an inverted water bottle, a water-heating tank positioned below the cooling receptacle, a water-transfer conduit and baffle means arranged to supply water from the cooling receptacle to the heating tank, but minimize reverse flow of heated water from the heating tank to the cooling receptacle, and a thermal insulating, water-distributing manifold demountably connected between the cooling receptacle and the heating tank for separately conducting chilled water from the cooling receptacle to an exteriorly accessible cold water faucet valve and heated water from the heating tank to a second, hot water faucet valve.

A principal object of the invention is to provide a water-distributing system for a hot and cold water dispenser which is constructed to permit ready assembly or disassembly of the component parts of the system to thereby facilitate field service, such as cleaning, repair and replacement of parts.

It is another object of the invention to provide a hot and cold water dispenser having improved thermal efficiency.

BRIEF DESCRIPTION OF THE DRAWINGS

FIG. 1 is a view in side elevation of a water-distributing system according to the present invention;

FIG. 2 is an enlarged, detailed vertical sectional view taken substantially along the line 2—2 of FIG. 1 and illustrating the manifold and baffle members of the water-distributing assembly;

FIG. 3 is an enlarged horizontal sectional view taken through the manifold substantially along the line 3—3 of FIG. 1;

FIG. 4 is a detailed horizontal sectional view taken substantially along the line 4—4 of FIG. 2;

FIG. 5 is a similar view taken substantially along the line 5—5 of FIG. 2.

DETAILED DESCRIPTION OF PREFERRED EMBODIMENT

Referring now to FIG. 1, the principal components of the present water-distributing assembly are shown in full lines, whereas the surrounding cabinet and the conventional mechanical components of the hot and cold water dispenser are shown in broken lines. The present water-distributing assembly comprises a pair of vertically spaced liquid-receiving tanks or receptacles 10 and 12. The upper water-cooling receptacle 10 is formed with an open-mouth 14 located adjacent the top wall of the dispenser and arranged to receive the neck portion 16 of an inverted water supply bottle 18. Wound about and carried in direct heat exchange relation to the lower portion of the cooling receptacle 10 are the convolutions of a refrigerant evaporator and cooling coil 20 of a conventional liquid-gas refrigerant system which also includes the usual motor-driven compressor 19 and a convoluted condenser coil 21. The hot water tank 12 is equipped with a conventional, interior, immersion-type electrical resistance heating element 22 which has its opposite circuit terminals 23 and 24 electrically connected with the power supply leads L1 and L2 through a series connected thermostatic switch 26. The thermostatic switch 26 is connected in direct heat exchange relation with the bottom of the tank 12 and is operable to maintain the water within the tank at a predetermined elevated temperature of around 180°F. The entire hot water tank assembly 12 is surrounded by a hollow cylinder 28 of thermal insulating material and the tank 12 is equipped with a normally closed drain pipe 29.

Positioned between the heating tank 12 and the cooling receptacle 10 is a water-distributing manifold 30 to which is detachably connected a pair of horizontally and outwardly extending conduits 32 and 33 which extend through a recessed front panel 34a of the dispenser cabinet 34. The conduits 32 and 33 are formed at their outer ends with screw-threaded nipples 35 to which are threadedly secured a pair of manually operable faucet valves 36. As shown in FIG. 1, the faucet valves 36 are positioned adjacent the recessed front panel 34a of the dispenser cabinet 34 and are arranged to discharge drinking water from the dispenser into a cup or other receptacle held therebeneath. The inner ends of the conduits 32 and 33 are formed to include right angular elbow formations 32a and 33a which telescope over a pair of outlet nipples 30a and 30b formed on the manifold 30. Each of the manifold nipples 30a and 30b is formed with a circumferential groove in which is positioned a resiliently flexible O-ring seal 31 arranged to sealingly engage the inner walls of the elbows 32a and 33a to provide a slip-fit, liquid-tight seal between the elbows and the nipples 30a and 30b. The manifold body 30 is formed at its upper end with a relatively shallow inlet chamber or opening 30c which is defined by an upwardly extending, annular shoulder or flange 30d formed integrally on the upper wall of the manifold body 30. The manifold body 30 is further formed in its upper portion with an inner central wall portion 37 which includes an arcuate, upwardly opening port 38 in fluid communication with the upper opening 30c of the manifold and with the axial passage of the nipple portion 30a. The inner, central wall portion 37 of the manifold 30 is further formed with a downwardly opening, arcuate port 39 disposed in diametrically opposed relation to the upwardly opening port 38. The port 39 communicates with the axial passage of the nipple portion 30b and with a downwardly opening, annular hot water chamber 40 formed in the bottom portion of the manifold 30. The central inner wall portion 37 of the manifold is further formed with an axial passage 41 extending therethrough. The manifold 30 and its remotely extending conduits 32 and 33 are preferably molded, or otherwise formed from a suitable tasteless, odorless, non-toxic synthetic resin material having reasonably good thermal insulating properties.

With reference to FIG. 2, it will be seen that the bottom wall 10a of the cooling tank 10 is formed with a central opening 42 which is bounded by an annular, depending lip or flange 43 formed integral with the bottom wall of the cooling tank. The outer diameter of the flange 43 is slightly less than the inner diameter of the annular flange 30d formed on the upper wall of the manifold 30, and is arranged to fit within the relatively shallow opening 30c of the manifold and to provide a circumferential seat for an annular O-ring seal 44 positioned between the lip 30d and the depending flange 43.

Positioned within the cooling tank or receptacle 10, and partially occupying the central bottom opening 42, is an internally threaded, sleeve or nut-type fitting 45 which is formed with a plurality of radially extended, inwardly shouldered lug sections 46 arranged to overlie the bottom wall 10a of the cooling receptacle adjacent the opening 42 thereof. The fitting 45 is formed to provide a series of notch-like ports 47 through which water may freely pass from the cooling receptacle through the outlet opening 42 of the tank 10 and into the cold water port 38 of the manifold 30. The internally threaded passage of the fitting 45 threadedly receives the cooperatively threaded, upper end portion of a coaxially disposed connector pipe or conduit 48. The pipe 48 is arranged to extend downwardly through the central axial passage 41 formed in the inner central wall 37 of the manifold 30, and terminates in a lower screw-threaded end portion 49 which projects downwardly a distance beyond the lower end of the manifold 30.

The heating tank 12 is formed to include an upper head or boss portion 50 formed with a substantially flat upper surface 51 arranged to seat against the annular bottom surface of the manifold 30. The annular bottom surface of the manifold 30 is preferably formed with an annular, downwardly opening groove or recess 52 in which is positioned an annular, O-ring seal 53 for sealing engagement with the flatted upper surface 51 of the heating tank. The upper, circular boss 50 of the heating tank 12 is also formed with an internally threaded socket or opening 54 to threadedly receive the lower threaded end portion 49 of the connector pipe 48. Additionally, the flatted boss portion 50 of the tank 12 is formed with a series of radially disposed, circumferentially spaced outlet ports 55 which provide communication between the annular hot water chamber 40 of the manifold 30 and the interior of the heater tank 12.

Thus, as seen in FIG. 2, the screw-threaded connector pipe 48 and the slotted nut-type fitting 45 function to detachably connect the bottom wall 10a of the cooling receptacle 10 with the upper end of the heating tank 12, and to clamp the manifold assembly 30 tightly between the bottom wall 10a of the cooling receptacle and the upper end of the heating tank.

Advantageously, the tanks 10 and 12 and the manifold assembly 30 are supported on a transverse, horizontally disposed shelf 57 which forms a part of the load-bearing frame of the dispenser. The shelf 57 is formed with a central opening 57a sized to receive the circular boss portion 50 of the heating tank 12 and preferably includes an upturned forward flange 58, positioned adjacent the recessed front panel 34a of the dispenser cabinet 34, and formed with a pair of relatively spaced openings or sockets to receive and support the outer end portions of the conduits 32 and 33, as shown in FIG. 1. A block or bat 59 of thermal insulating material is also preferably positioned on the shelf 57 in surrounding relation to the manifold assembly 30 and its remotely extending conduits 32 and 33. Brazed or otherwise secured within the lower end of the connector pipe 48 is the upper end of a filler pipe extension 60 of a length to extend downwardly and coaxially to the lower region of the heating tank 12. The pipe 60 is formed toward its upper end with a vent opening 61 disposed immediately beneath the upper boss portion 50 of the tank 12.

Frictionally fitted within the upper end of the nut-type fitting 45 is the shouldered lower end portion of a riser pipe 62 which extends upwardly and coaxially within the cooling receptacle 10. Removably carried within the upper open end of the riser pipe 62 is the central, depending hub or stem portion 63 of a baffle plate 64. As seen in FIGS. 2 and 5, the central stem portion 63 of the baffle member 64 is formed with a plurality of triangularly spaced, radially extended fins or ribs 65 which function to support the baffle member 64 on the upper end of the riser pipe 62, while at the same time providing a series of slots or water passages 66 between the stem portion 63 and the inner wall surface of the riser pipe 62. The baffle plate 64 is of generally circular configuration and possesses a diameter slightly less than the inner diameter of the cooling tank or receptacle 10. The baffle plate 64 is formed along its peripheral edge with a plurality of circumferentially spaced U-shaped notches or recesses 67 to facilitate the flow of water vertically between the outer edge of the baffle plate and the inner wall of the cooling tank.

OPERATION

In operation, the present water-distributing assembly, which includes the upper cooling tank 10, the lower heating tank 12, the manifold 30, conduits 32 and 33, pipes 48, 60, and 62, fitting 45 and baffle member 64, is installed within the water dispenser cabinet 34 and is supported on the frame shelf 57 in the position shown in FIG. 1. As previously indicated, the cooling tank 10 and its cooling coil 20 and the heating tank 12 and manifold assembly are preferably enclosed or encased by thermal insulation, such as resin impregnated fiber glass and/or low density, foamed plastic material, so as to minimize heat loss. The assembly or disassembly of the several components of the water-distributing system is greatly facilitated by the simple screw-threaded connections between the lower end of the connector pipe 48 and the flatted boss 50 of the heating tank 12 and between the upper end of the pipe 48 and the internally threaded fitting 45. Likewise, the remotely extending faucet conduits 32 and 33 may be readily connected or disconnected from the manifold 30 by reason of the slip-fit joints provided between the elbows 32a and 33a and the nipples 30a and 30b.

With the water-distributing system assembled and installed as shown in FIGS. 1 and 2, a water supply bottle 18 is inverted and placed on the open mouth 14 of the cooling receptacle 10. The tanks 10 and 12 and the connecting conduits and manifold 30 may then be filled with water from the inverted bottle 18 simply by opening the faucet valve 36 which is connected with the hot water discharge conduit 33. Water will then flow downwardly by gravity from the receptacle 10 through the baffle stem passages 66, through the riser pipe 62, connector pipe 48 and its extension 60, into the heating tank 12, thence through the outlet ports 55 of the tank 12, through the chamber 40 and port 39 of the manifold 30, through the nipple 30b and through the conduit 33 to the open faucet 36. The cold water passages of the manifold 30 and the conduit 32 are likewise initially filled by the opening of the faucet valve 36 associated with the cold water supply conduit 32.

To insure the initial filling of the heating tank 12 with water from the inverted bottle 18, independently of the opening of the hot water faucet 36, the pipe extension 60 is provided with the relatively small vent opening 61 disposed substantially at the upper level of the tank 12. This vent opening 61 permits air which would otherwise be trapped in the tank 12 to be immediately exhausted from the upper end of the tank by the gravitational flow of water downwardly through the pipe extension 60 and into the lower end of the heating tank 12. Thus, if an attendant should forget to initially fill the hot water system by opening the hot water faucet 36 prior to energizing the tank heating element 22, there will still be sufficient water within the heating tank to prevent a "burn out" of the heating element which might otherwise occur in the case of a "dry" tank.

Following the filling of the entire water-distributing system, the electrically operated tank-heating element 22 and refrigerating system of the dispenser are "switched" on or energized and the water within the tank will be heated to a desired elevated temperature, while the water within the lower portion of the cooling receptacle or reservoir 10 will be cooled or chilled by the cooling coil 20 of the refrigeration system of the dispenser.

As will be understood, during intervals of non-use of the dispenser the thermodynamics of the water-distributing system tend to approach a condition of stability in which the volume of water occupying the lower portion of the receptacle 10 and the cold water passages of the manifold 30 and conduit 32 will be chilled to a lower temperature than the volume of water occupying the upper portion of the receptacle 10 adjacent the mouth of the water bottle 18. Also, due to natural thermal convection flow, the water occupying the upper region of the heating tank 12 and the communicating passages of the manifold 30 and hot water conduit 33 will be at a higher temperature than the water in the lower region of the heating tank. To reduce the tendency toward mixing of the cold, refrigerated water within the lower portion of the cooling receptacle with the warmer (atmospheric temperature) water from the bottle 18, particularly upon the momentary opening of the cold water faucet valve 36, the baffle plate 64, which is preferably formed from a synthetic resin or plastic material is provided at an intermediate level within the cooling receptacle. The baffle plate 64 thus provides both a partial physical and thermal insulating barrier between the warmer incoming water from the bottle 18 and the cooled water which occupies the lower region of the receptacle 10. Also, by locating the upper end of the riser pipe 62, which is also preferably formed from a synthetic resin, within the upper region of the receptacle 10, the water which is supplied to the heating tank 12 will be relatively warmer than that which occupies the lower region of the receptacle.

The construction and function of the depending hub or stem portion 63 of the baffle plate also plays an important part in the thermodynamic efficiency of the present water-distributing system. As is well-known, warmer water within a confined column of water tends to flow upwardly by convection within the central region of the column, while the cooler water descends along the outer sides of the column. Thus, the central, imperforate portion of the stem portion 63 of the baffle member effectively blocks the central portion of the column of water occupying the connector pipe 48 and the riser pipe 62, and thereby minimizes the convective flow of heated water from the heating tank 12 into the cooling receptacle 10. At the same time, the relatively spaced slots or recesses 66 provided at the outer periphery of the stem 63 provide for substantially unrestricted flow of water from the upper region of the receptacle 10 through the riser pipe 62, connector pipe 48 and extension pipe 60 into the lower region of the heating tank 12.

It will thus be seen that the present water-distributing assembly functions to effectively isolate the heated water in the tank 12 from the refrigerated, chilled water within the lower regions of the receptacle 10. By constructing the manifold 30, conduits 32 and 33, fitting 45, riser pipe 62 and baffle member 64 from plastic or synthetic resin materials, rather than metal, thermal conduction through these parts is reduced, thereby further adding to the thermal efficiency of the system.

When the system is filled with water from the bottle 18 and the heating element 22 and refrigeration system are energized (intermittently), hot water from the upper region of the tank 12 may be drawn outwardly through the hot water chamber 40 and port 39 and conduit 33 upon opening of the faucet valve 36 connected at the outer end of the conduit 33. When it is desired to dispense cold or chilled water, the opposite faucet valve 36 connected with the outer end of the conduit 32 is opened to cause the discharge of refrigerated water from the lower region of the cooling receptacle 10 by way of the notched ports 47 of the fitting 45, the port 38 of the manifold 30 and thence through the conduit 32.

The present water-distributing assembly is further characterized by its ease of assembly and disassembly of its component parts. The absence of soldered or brazed joints and connections between the heating and cooling tanks, the manifold 30 and its associated conduits 32 and 33 and faucets 36, greatly facilitates field disassembly for cleaning, repair and other periodic servicing operations.

While a single preferred embodiment of the invention has been illustrated and described in detail, it will be understood that various modifications in details of construction and design are possible without departing from the spirit of the invention or the scope of the following claims.

I claim:

1. In a hot and cold water dispenser; a generally vertically arranged water-cooling receptacle having an outlet port in the bottom thereof; a water-heating tank disposed in vertically spaced relation beneath said cooling tank and having a top wall provided with an outlet port; a water-distributing manifold positioned between the bottom of said cooling receptacle and the top of said heating tank and including a first passage means communicating with the outlet port of said cooling receptacle and a second, separate passage means communicating with the outlet port of said heating tank; and conduit means extending vertically through said manifold and detachably interconnecting said cooling receptacle and said heating tank and providing fluid communication between the upper region of said cooling receptacle and the lower region of said heating tank.

2. The combination as defined in claim 1, including screw-threaded means associated with said conduit means and detachably holding said cooling receptacle, said manifold and said heating tank in clamped, unitary relationship.

3. The combination as defined in claim 1, wherein said manifold is composed of a thermally insulating, synthetic resin material.

4. The combination as defined in claim 1, wherein said manifold includes a pair of readily detachable, remotely extending discharge pipes disposed respectively in fluid communication with the first and second passages of said manifold.

5. The combination as defined in claim 1, including a baffle member carried by said conduit means and extending transversely within said cooling receptacle and providing a partial thermal barrier between the upper and lower regions of said cooling receptacle.

6. The combination as defined in claim 5, wherein said baffle member, said manifold and at least a part of said conduit means are composed of thermally insulating, synthetic resin material.

* * * * *